(12) United States Patent
Yang

(10) Patent No.: US 11,678,066 B2
(45) Date of Patent: Jun. 13, 2023

(54) IMAGE PROCESSING METHOD, ELECTRONIC DEVICE AND MEDIUM

(71) Applicant: VIVO MOBILE COMMUNICATION CO.,LTD., Guangdong (CN)

(72) Inventor: Zhuojian Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/691,859

(22) Filed: Mar. 10, 2022

(65) Prior Publication Data

US 2022/0201223 A1 Jun. 23, 2022

Related U.S. Application Data

(63) Continuation of application No. PCT/CN2020/116887, filed on Sep. 22, 2020.

(30) Foreign Application Priority Data

Sep. 27, 2019 (CN) .......................... 201910921251.6

(51) Int. Cl.
*H04N 23/76* (2023.01)
*H04N 23/13* (2023.01)
*H04N 23/57* (2023.01)
*H04N 23/71* (2023.01)

(52) U.S. Cl.
CPC ............. *H04N 23/76* (2023.01); *H04N 23/13* (2023.01); *H04N 23/57* (2023.01); *H04N 23/71* (2023.01)

(58) Field of Classification Search
CPC ........ H04N 23/13; H04N 23/55; H04N 23/57; H04N 23/71; H04N 23/76; H04N 25/42
See application file for complete search history.

(56) References Cited

U.S. PATENT DOCUMENTS 10,122,969 B1 * 11/2018 Lim .......................... G06T 7/11
2017/0201692 A1 7/2017 Wu
2017/0251137 A1 * 8/2017 Evans, V .......... G02F 1/133514
(Continued)

FOREIGN PATENT DOCUMENTS

| CN | 103986874 A | 8/2014 |
|---|---|---|
| CN | 204836352 U | 12/2015 |

(Continued)

OTHER PUBLICATIONS

The First Office Action of Priority Application No. CN 201910921251.6 issued by the Chinese Patent Office dated Aug. 27, 2020.
(Continued)

*Primary Examiner* — Amy R Hsu
(74) *Attorney, Agent, or Firm* — IP & T Group LLP

(57) ABSTRACT

An image processing method includes: obtaining a first image photographed by each of N color cameras in the M color cameras; obtaining, for each first image, luminance values of at least a part of pixels in the first image; and increasing brightness of a target image by using the obtained luminance values, and using the target image with increased brightness as an image photographed by the under-screen camera assembly, the target image being the first image photographed by one of the N color cameras, where both M and N are integers greater than or equal to 2, and N is less than or equal to M.

19 Claims, 6 Drawing Sheets

(56) References Cited

U.S. PATENT DOCUMENTS

| | | | | |
|---|---|---|---|---|
| 2018/0114493 A1* | 4/2018 | McLaughlin | .......... | H04N 23/80 |
| 2018/0152611 A1 | 5/2018 | Li et al. | | |
| 2019/0158713 A1* | 5/2019 | McMillan | .............. | H04N 23/57 |
| 2020/0195764 A1* | 6/2020 | Xu | .......................... | H04N 23/45 |
| 2021/0058568 A1* | 2/2021 | Ivanov Bonev | ......... | H04N 5/33 |

FOREIGN PATENT DOCUMENTS

| | | | |
|---|---|---|---|
| CN | 105611185 A | 5/2016 | |
| CN | 107079083 A | 8/2017 | |
| CN | 109348123 A | 2/2019 | |
| CN | 109587396 A | 4/2019 | |
| CN | 109756680 A | 5/2019 | |
| CN | 109788207 A | 5/2019 | |
| CN | 109840475 A | 6/2019 | |
| CN | 110062082 A | 7/2019 | |
| CN | 110971805 A | 4/2020 | |
| EP | 3413545 A1 | 12/2018 | |
| WO | 2012/057619 A1 | 5/2012 | |

OTHER PUBLICATIONS

International Search Report and Written Opinion of International Application No. PCT/CN2020/116887 issued by the Chinese Patent Office dated Nov. 30, 2020.

\* cited by examiner

Camera 1

Camera 2

Camera 3

Camera 4

Camera 1

Camera 2

Camera 3

Camera 4

IMAGE PROCESSING METHOD, ELECTRONIC DEVICE AND MEDIUM

CROSS-REFERENCE TO RELATED APPLICATIONS

This application is a Bypass Continuation Application of PCT/CN2020/116887, filed on Sep. 22, 2020, which claims priority to Chinese Patent Application No. 201910921251.6, filed on Sep. 27, 2019, which are incorporated herein by reference in their entirety.

TECHNICAL FIELD

This application relates to the field of data processing, and in particular, to an image processing method and apparatus, an electronic device, and a medium.

BACKGROUND

With the rapid development of technologies of the mobile intelligent electronic device, users' demand for the mobile intelligent electronic device is increasing. Various mobile phone manufacturers are trying to increase a screen-to-body ratio of the electronic device to improve the user experience. However, because the lens of the front-facing camera must have a specific transmittance, a black block may be formed on the display screen and the lens area of the camera, and the picture cannot be displayed, which affects the user experience.

SUMMARY

This application provides an image processing method and apparatus, an electronic device, and a medium.

A first aspect of this application provides an image processing method, performed by to an electronic device, the electronic device includes an under-screen camera assembly, and the under-screen camera assembly includes M color cameras, where the image processing method includes:

obtaining a first image photographed by each of N color cameras in the M color cameras;

obtaining, for each first image, luminance values of at least a part of pixels in the first image; and increasing brightness of a target image by using the obtained luminance values, and using the target image with increased brightness as an image photographed by the under-screen camera assembly, the target image being the first image photographed by one of the N color cameras, where both M and N are integers greater than or equal to 2, and N is less than or equal to M.

According to a second aspect, this application provides an image processing apparatus, performed by an electronic device, the electronic device includes an under-screen camera assembly, and the under-screen camera assembly includes M color cameras, where the image processing apparatus includes:

an image obtaining module, configured to obtain a first image photographed by each of N color cameras in the M color cameras;

a luminance value obtaining module, configured to obtain, for each first image, luminance values of at least a part of pixels in the first image; and a brightness increasing module, configured to increase brightness of a target image by using the obtained luminance values, and use the target image with increased brightness as an image photographed by the under-screen camera assembly, the target image being the first image photographed by one of the N color cameras, where both M and N are integers greater than or equal to 2, and N is less than or equal to M.

According to a third aspect, this application further provides an electronic device, including:

an under-screen camera assembly, including M color cameras; and an image processing apparatus, configured to obtain a first image photographed by each of N color cameras in the M color cameras; obtain, for each first image, luminance values of at least a part of pixels in the first image; and increase brightness of a target image by using the obtained luminance values, and use the target image with increased brightness as an image photographed by the under-screen camera assembly, the target image being the first image photographed by one of the N color cameras, where both M and N are integers greater than or equal to 2, and N is less than or equal to M.

According to a fourth aspect, this application further provides an electronic device, including a processor, a memory, and a computer program that is stored in the memory and may run on the processor, and when the computer program is executed by the processor, the image processing method according to the first aspect of this application is implemented.

According to a fifth aspect, this application further provides a non-transitory computer-readable storage medium on which computer program instructions are stored, and when the computer program instructions are executed by a processor, the image processing method according to the first aspect of this application is implemented.

BRIEF DESCRIPTION OF THE DRAWINGS

It may be better understood from the following descriptions of specific implementations of this application with reference to the accompanying drawings that same or similar reference numerals represent same or similar features in this application.

DETAILED DESCRIPTION OF THE EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

At present, the design of digging a hole in the display screen or the backlight area, such as the under-screen water drop screen, may increase the screen-to-body ratio of the mobile phone to a specific extent. However, from the front view, the user may still see a black dot left for the camera, and the full-screen display has not yet been fully realized.

The full-screen display may be realized when the camera is placed below the display screen, but because the display screen only has a specific light transmittance, the brightness of the image photographed by the camera is very low.

Figure 1:
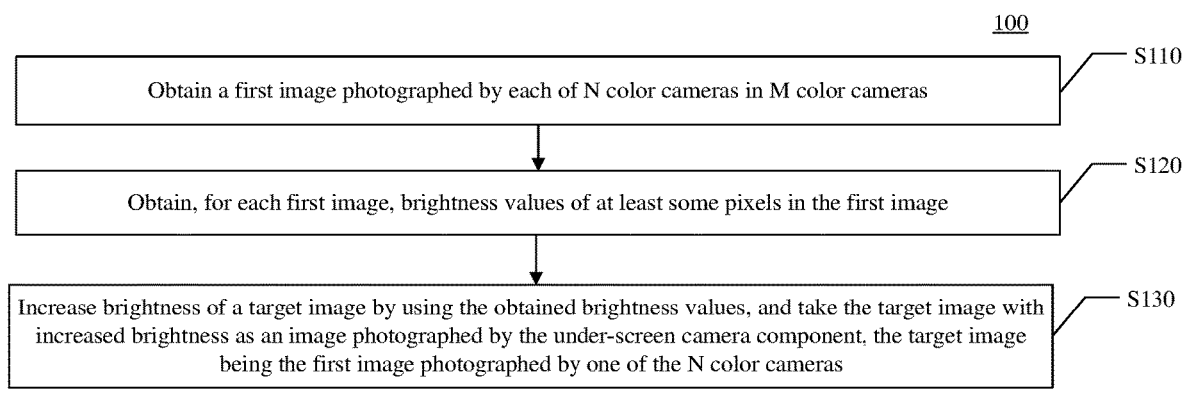
FIG. 1 is a schematic flowchart of an embodiment of an image processing method according to a first aspect of this application.
Figure 2:
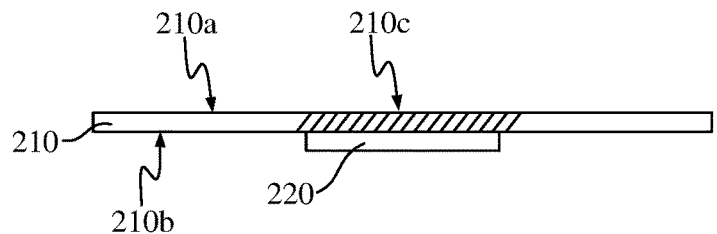
FIG. 2 is a front view of an example of an electronic device to which an image processing method of a first aspect of this application may be applied.

FIG. 1 is a schematic flowchart of an embodiment of an image processing method 100 performed by an electronic device according to a first aspect of this application. As shown in FIG. 2, an electronic device 200 to which the image processing method 100 provided in this application is applied includes:

a display panel 210 with a first surface 210a and a second surface 210b opposite to each other, the first surface 210a being a display surface of the display panel 210, and the display panel 210 including a light-transmitting area 210c; and an under-screen camera assembly 220, disposed at a side of the second surface 210b of the display panel 210 and corresponding to the light-transmitting area 210c, and the under-screen camera assembly 220 including M color cameras, where M is an integer greater than or equal to 2.

The display panel 210 in the light-transmitting area 210c may be made of light-transmitting materials such as glass or polyimide (PI).

In this embodiment of this application, the electronic device includes but is not limited to a mobile phone, a tablet computer, a notebook computer, a palmtop computer, a vehicle-mounted terminal, a wearable device, or the like.

Figure 3:
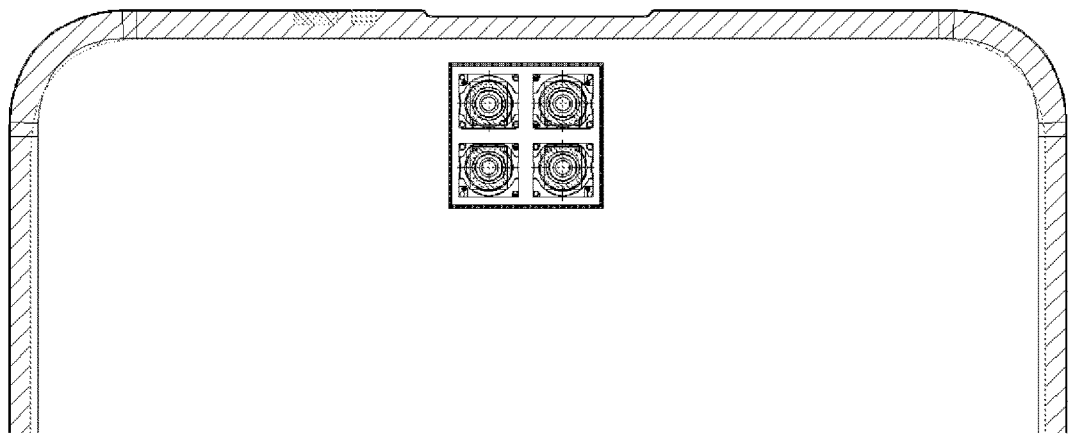
FIG. 3 is a top view of an example of an under-screen camera assembly including four color cameras in an example of an electronic device.

In this embodiment of this application, the M color cameras in the under-screen camera assembly 220 may be arranged according to a preset rule. For example, the M color cameras may be arranged along a preset arc track, arranged along a preset circular track, or arranged in an array. As an example, the under-screen camera assembly 220 includes four color cameras arranged in an array, and FIG. 3 is a top view of the four cameras.

Figure 4:
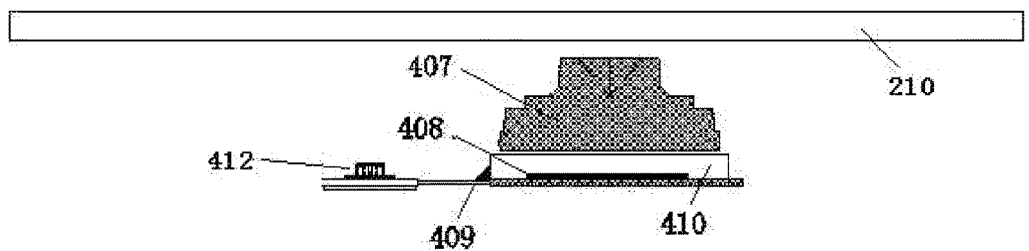
FIG. 4 is a front view of an example of a color camera in an example of an electronic device.
Figure 5:
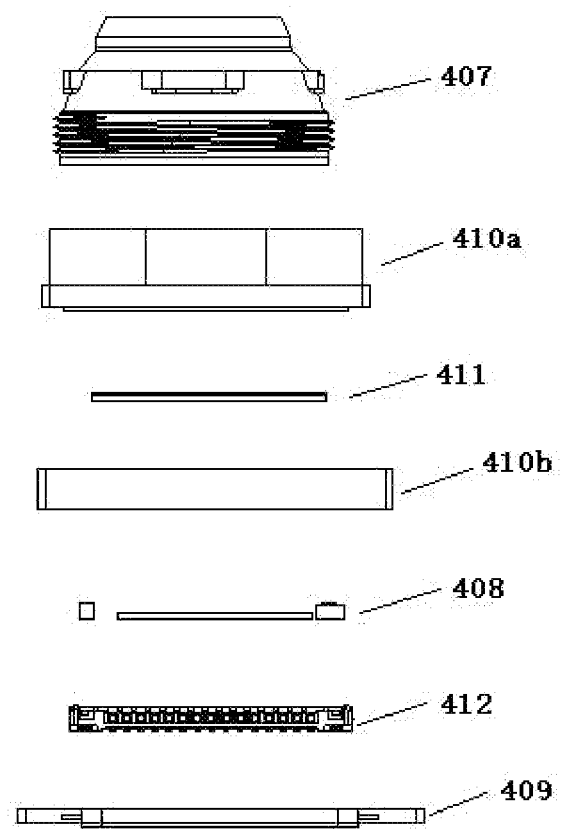
FIG. 5 is an exploded view of a color camera in FIG. 4.

In some embodiments of this application, the color cameras in the under-screen camera assembly 220 have a same structure. FIG. 4 and FIG. 5 are respectively a side view and an exploded view of the color camera. As shown in FIG. 4, the color camera includes a lens 407, a photosensitive chip 408, a circuit board 409 connected to the photosensitive chip 408, a lens holder 410, and a filter component 411. As an example, the circuit board 409 may be a flexible printed circuit (FPC). The lens 407 is a condenser lens.

Referring to FIG. 4, the lens holder 410 is disposed on the circuit board 409. The lens 407 and the filter component 411 are disposed on the lens holder 410. Referring to FIG. 5, the lens holder 410 includes a first mounting portion 410a and a second mounting portion 410b. The first mounting portion 410a is used to mount the lens 407. In some embodiments, the lens 407 may be connected to the first mounting portion 410a through threads. A plurality of lenses may be installed in the lens 407. The second mounting portion 410b is used to mount the filter component 411. The filter component 411 is disposed in a cavity of the lens holder 410.

Referring to FIG. 4, the lens 407 and the photosensitive chip 408 are disposed opposite to each other, and the photosensitive chip 408 is disposed on the circuit board 409 and is electrically connected to the circuit board 409. Referring to FIG. 5, the filter component 411 is located between the lens 407 and the photosensitive chip 408, and is used to implement a filter function during a shooting process.

In this embodiment of this application, the color camera further includes a connector 412, the connector 412 is disposed on the circuit and is electrically connected to the circuit board 409, and the connector 412 is used to connect an external device to transmit power and information for the color camera.

Figure 6:
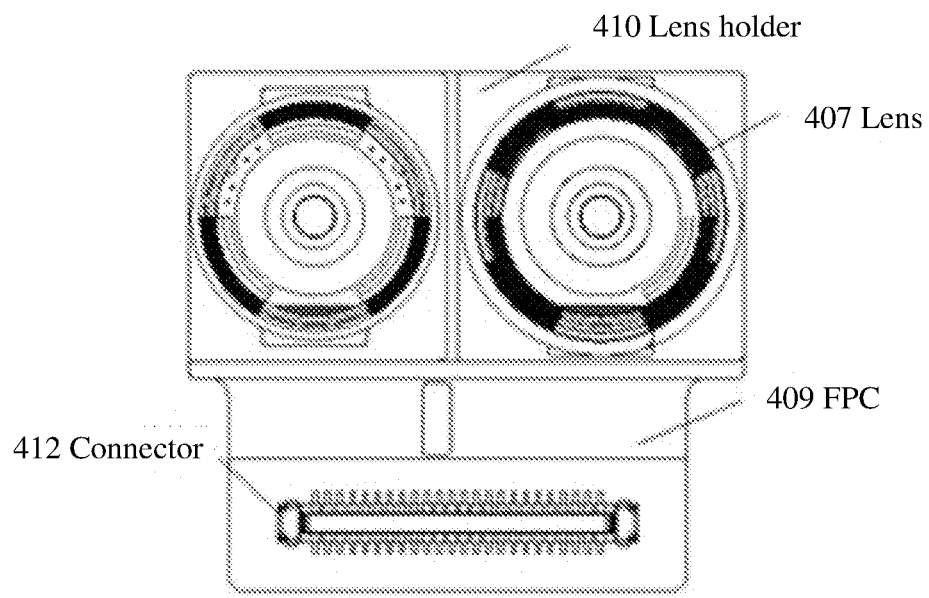
FIG. 6 is a top view of an example of an under-screen camera assembly including two color cameras in an example of an electronic device.
Figure 7:
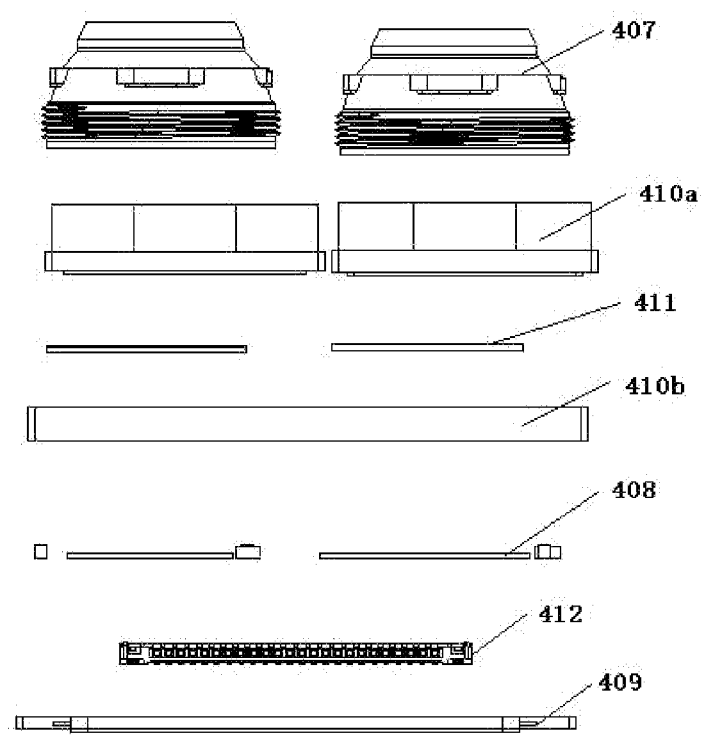
FIG. 7 is an exploded view of two color cameras in FIG. 6.

In some embodiments of this application, in order to save internal space of the electronic device, two color cameras of the under-screen camera assembly 220 may share the circuit board 409 and the connector 412. FIG. 6 and FIG. 7 are respectively a top view and an exploded view of the two color cameras sharing the circuit board 409 and the connector 412.

In this embodiment of this application, it is not necessary to dig a hole in the display screen or the backlight area by disposing the under-screen camera assembly 220 at the side of the second surface 210b of the display panel 210, and the full-screen display of the electronic device may be realized. In a case that the electronic device has realized the full-screen display, the light-transmitting area 210c of the display panel 210 also needs to have a display function, but the light-transmitting area 210c only has a specific light transmittance. Therefore, to ensure that an image photographed by the under-screen camera assembly 220 under the display panel 210 has higher brightness, the image processing method shown in FIG. 1 is required.

Referring to FIG. 1, the image processing method 100 provided in this application includes S110 to S130.

S110: Obtain a first image photographed by each of N color cameras in the M color cameras.

S120: Obtain, for each first image, luminance values of at least a part of pixels in the first image.

S130: Increase brightness of a target image by using the obtained luminance values, and use the target image with increased brightness as an image photographed by the under-screen camera assembly 220.

The target image is the first image photographed by one of the N color cameras. N is an integer greater than or equal to 2, and N is less than or equal to M.

In this embodiment of this application, an independent lens 407 is disposed above a photosensitive chip 408 of each color camera in the under-screen camera assembly 220, and the lens 407 may image independently. For each color camera, a combination of the photosensitive chip 408 and the lens 407 in the color camera may ensure that each color camera has a specific light transmittance. Compared with disposing a single camera under the display panel 210, at least two color cameras are disposed at a side of the second surface 210b of the display panel 210 and are corresponding to the light-transmitting area 210c, which may increase brightness collected by the under-screen camera assembly 220, namely, the light transmittance of the under-screen camera assembly 220 is improved. Therefore, the luminance values of the at least a part of pixels in the first image collected by each color camera are used to increase the brightness of the selected target image, and the target image with increased brightness is used as an image photographed by the under-screen camera assembly 220, thereby increasing the brightness of the image photographed by the under-screen camera assembly 220.

In some embodiments of this application, an image photographed by a color camera at a preset location of the N color cameras may be taken as the target image. As an example, if at least two cameras are arranged in a line, an image photographed by a color camera at the center position may be taken as the target image.

In some embodiments, S120 includes S1201 to S1205.

S1201: Obtain a target photographing distance between the under-screen camera assembly 220 and the target object of the under-screen camera assembly 220.

In this embodiment of this application, the target photographing distance is a distance between the under-screen camera assembly 220 and a target object to be photographed. Due to a close distance between each color camera in the under-screen camera assembly 220, it may be considered that the photographing distance from each color camera to the target object is the same.

It is worth mentioning that when the under-screen camera assembly 220 needs to photograph the target object, the light-transmitting area 210c above the under-screen camera assembly 220 should be extinguished, that is, the display function is suspended.

S1203: Obtain a target area of each first image at the target photographing distance based on a predetermined target area in an image photographed by each color camera at pre-stored different photographing distances.

In this embodiment of this application, the under-screen camera assembly 220 may be calibrated in advance, that is, each color camera of the under-screen camera assembly 220 is used to photograph a calibrated object at different photographing distances. At any photographing distance, for images photographed by each color camera, a position area of the calibrated object in the image is taken as a predetermined target area of the image. The calibrated object may be a target object to be photographed, or other objects to be photographed. If the calibrated object is the target object, a predetermined target area of a pre-stored image photographed by the color camera at any photographing distance is a position area in which the target object is located in the image.

As an example, the predetermined target area may be expressed by using a pixel coordinate range. At any photographing distance, a quantity of pixels in the predetermined target area of the image photographed by each color camera is the same. At a photographing distance, each pixel in the predetermined target area of the image photographed by one color camera has a pixel with same color information in a corresponding position of a predetermined target area of an image photographed by other color cameras.

Figure 8:
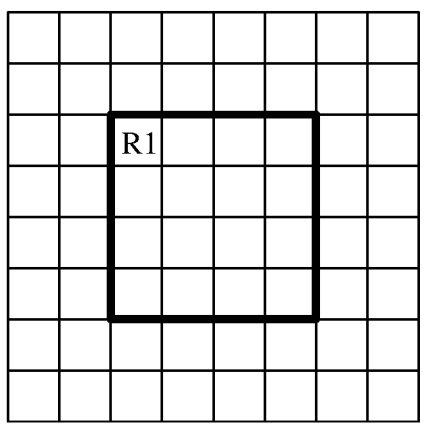
FIG. 8 is a schematic diagram of an example of a target area of a first image according to an embodiment of this application.
Figure 8:
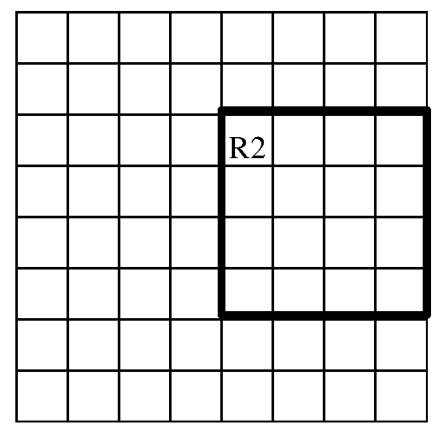
Figure 8:
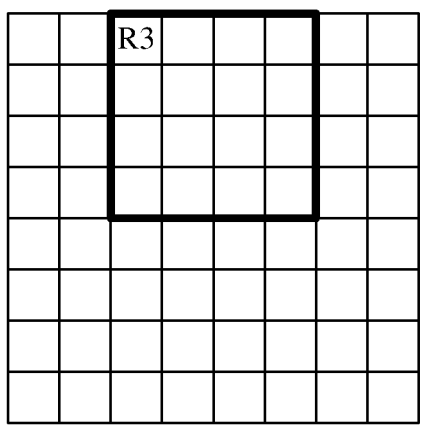
Figure 8:
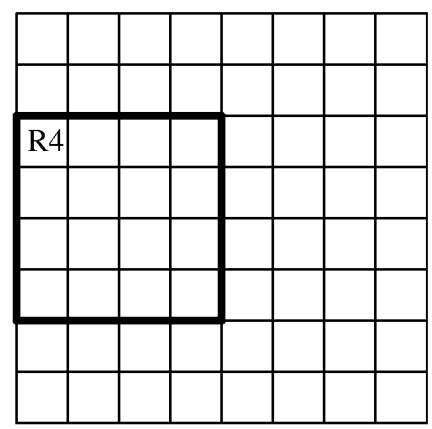

As shown in FIG. 8, as an example, the under-screen camera assembly 220 includes four color cameras, and it is assumed that a size of a first image photographed by each camera for the target object is 8 pixels×8 pixels. An area of 4 pixels×4 pixels in a thick black frame in each first image is the target area corresponding to the first image. The target area in FIG. 8 is only a schematic diagram, and the size of the image in FIG. 8 is only for reference, and is not specifically limited. In some embodiments, the size of the first image may be 8 million pixels×8 million pixels.

S1205: Obtain, for each first image, a luminance value of each pixel in the target area of the first image.

In some embodiments of this application, a luminance value of each pixel in a target area of each first image needs to be used to increase the luminance value of the pixel in the target area of the target image. Therefore, luminance values of all pixels in the target area of each first image need to be obtained first.

After obtaining the luminance value of each pixel in the target area of each first image, step S140 includes S1401 to S1402.

S1401: Use each pixel in a target area of the target image as a first target pixel.

In this embodiment of this application, the luminance value of each pixel in the target area of the target image needs to be increased, and therefore, each pixel in the target area of the target image may be used as the first target pixel.

S1402: Add, for each first target pixel, a luminance value of the first target pixel to a first luminance value to obtain a first target luminance value, and increase the luminance value of the first target pixel to the first target luminance value.

The first luminance value is a sum of luminance values of pixels corresponding to the first target pixel in a target area of each first image other than the target image.

It should be noted that each first target pixel has a corresponding position in the target area of each first image other than the target image, and pixels in the corresponding position have same color information.

As an example, referring to FIG. 8, pixels in an i-th row and j-th column of each target area are in the corresponding position, and color information of pixels in the corresponding position of each target area is the same.

Referring to FIG. 8, there are 4 corresponding pixels in a first row and first column of each target area, and color information of the four pixels is red. If a first image photographed by a first color camera is the target image, the pixel in the first row and first column of the target area in the upper left corner of FIG. 8 is the first target pixel, and it is assumed that a luminance value of the first target pixel is R1. It is assumed that a luminance value of the pixel in the first row and first column of the target area in the upper right corner of FIG. 8 is R2, a luminance value of the pixel in the first row and first column of the target area in the lower left corner of FIG. 8 is R3, and a luminance value of the pixel in the first row and first column of the target area in the lower right corner of FIG. 8 is R4, where the first luminance value R'=R2+R3+R4. The first target luminance value total R corresponding to the pixels in the first row and first column of the target area of the target image is R1+R'=R1+R2+R3+R4. Then the luminance value of the pixel in the first row and first column in the target area of the target image is increased to the total R.

According to the similar method mentioned above, the luminance value of each pixel in the target area of the target image may be increased. Then the target image with increased brightness in the target area is used as the image photographed by the under-screen camera assembly 220 for the target object.

In this embodiment of this application, luminance values of all pixels in a target area of each first image are used to increase a luminance value of each pixel in the target area of the target image, thereby increasing the brightness of the image photographed by the under-screen camera assembly 220.

In this embodiment of this application, fields of view of all cameras in the under-screen camera assembly 220 have a same overlapping area. Since a field of view of each color camera has a same overlapping area, the image photographed by each color camera has a corresponding target area.

The closer the distance between each color camera in the under-screen camera assembly 220 is set, the more the quantity of pixels included in the target area of each first image, which may further increase overall brightness of the image photographed by the under-screen camera assembly 220.

In some embodiments of this application, in order to reduce brightness difference between the target area and a non-target area in the image photographed by the under-screen camera assembly 220 for the target object, in step S140, a luminance value of each pixel in the non-target area of the target image may further be obtained, and then the obtained luminance value of each pixel in the non-target area of the target image is increased by a preset multiple.

As an example, the preset multiple is N−1 times. In other words, the luminance value of each pixel in the non-target area of the target image is adjusted to N times the original.

In other embodiments of this application, in order to improve an image processing speed, the luminance values of all the pixels in each first image may be directly used to increase the brightness of the target image instead of obtaining the target area of each first image. Optionally, in step S120, obtain, for each first image, luminance values of all pixels in the first image.

After obtaining the luminance values of all the pixels in each first image, step S140 includes S1401' to S1402'.

S1401': Use each pixel in the target image as a second target pixel.

S1402': Add, for each second target pixel, a luminance value of the second target pixel to a second luminance value to obtain a second target luminance value, and increase the luminance value of the second target pixel to the second target luminance value.

The second luminance value is a sum of luminance values of pixels corresponding to the second target pixel in each first image other than the target image.

In some embodiments of this application, each first image has a same size, all the pixels in the i-th row and j-th column of each first image are taken as pixels corresponding to each other, and corresponding pixels in each first image have same color information.

Figure 9:
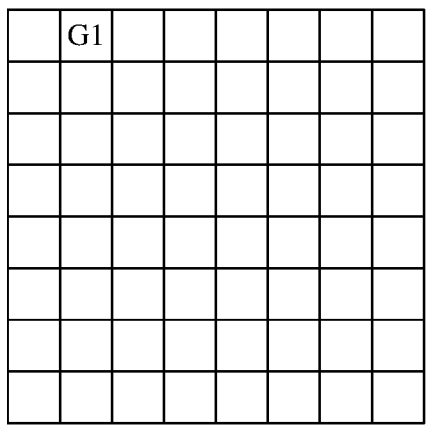
FIG. 9 is a schematic diagram of an example of a correspondence between different pixels in a first image according to an embodiment of this application.
Figure 9:
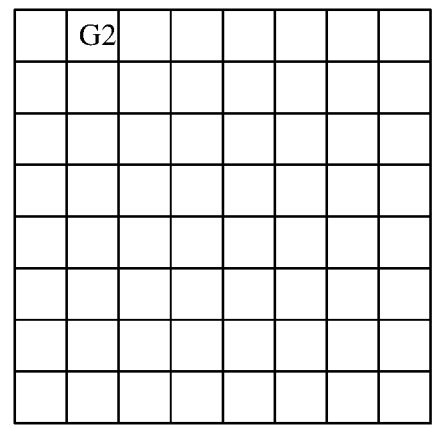
Figure 9:
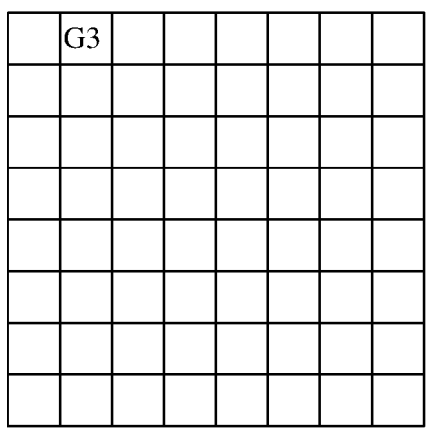
Figure 9:
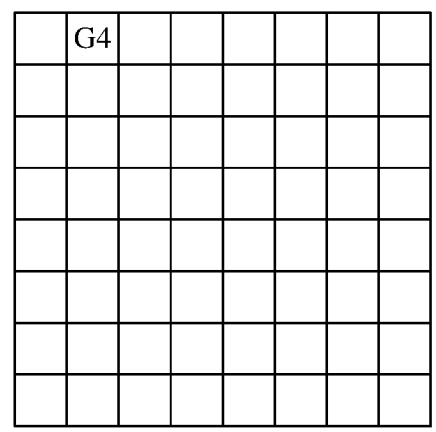

Referring to FIG. 9, there are 4 corresponding pixels in a first row and second column of each first image, and color information of the four pixels is green. It is assumed that a luminance value of the pixel in the first row and second column of the first image in the upper left corner of FIG. 9 is G1, a luminance value of the pixel in the first row and second column of the first image in the upper right corner of FIG. 9 is G2, a luminance value of the pixel in the first row and second column of the first image in the lower left corner of FIG. 9 is G3, and a luminance value of the pixel in the first row and second column of the first image in the lower right corner of FIG. 9 is G4, where the second luminance value G'=G2+G3+G4. The second target luminance value total G corresponding to the pixels in the first row and first column of the target image is G1+G'=G1+G2+G3+G4. Then the luminance value of the pixel in the first row and second column of the target image is increased to the total G.

According to the similar method mentioned above, the luminance value of each pixel in the target image may be increased. Then the target image in which the brightness of each pixel is increased is taken as the image photographed by the under-screen camera assembly 220 for the target object.

In other words, if the distance between the color cameras of the under-screen camera assembly 220 is very close, the difference between each first image may be ignored, and all the pixels in each first image may be directly used to increase the brightness of the target image instead of pre-calibrating the target area, which improves the image processing speed while increasing the brightness of the image photographed by the under-screen camera assembly 220.

Figure 10:
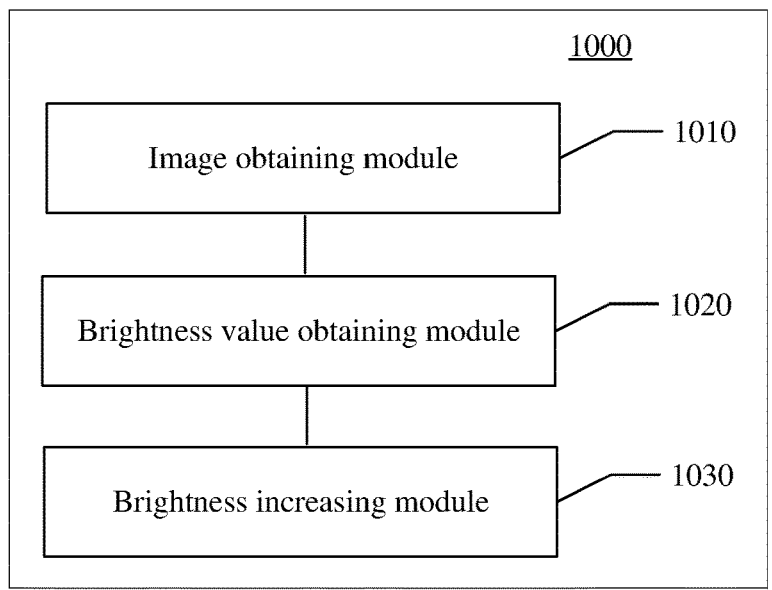
FIG. 10 is a schematic structural diagram of an embodiment of an image processing apparatus according to a second aspect of this application.

FIG. 10 is a schematic structural diagram of an embodiment of an image processing apparatus according to a second aspect of this application. The image processing apparatus 1000 provided in this embodiment of this application includes:

an image obtaining module 1010, configured to obtain a first image photographed by each of N color cameras in the M color cameras;

a luminance value obtaining module 1020, configured to obtain, for each first image, luminance values of at least a part of pixels in the first image; and a brightness increasing module 1030, configured to increase brightness of a target image by using the obtained luminance values, and use the target image with increased brightness as an image photographed by the under-screen camera assembly, the target image being the first image photographed by one of the N color cameras.

In this embodiment of this application, the luminance values of the at least a part of pixels in the first image collected by each color camera that is disposed at a side of a second surface 210b of a display panel 210 and that is corresponding to a light-transmitting area 210c are used to increase the brightness of the target image, and the target image with increased brightness is used as an image photographed by the under-screen camera assembly 220, thereby increasing the brightness of the image photographed by the under-screen camera assembly 220 while realizing the full-screen display.

In this embodiment of this application, the luminance value obtaining module 1020 includes:

a target photographing distance obtaining unit, configured to obtain a target photographing distance between the under-screen camera assembly 220 and the target object of the under-screen camera assembly 220;

a target area determining unit, configured to obtain a target area of each first image at the target photographing distance based on a predetermined target area in an image photographed by each color camera at pre-stored different photographing distances; and a first luminance value obtaining unit, configured to obtain, for each first image, a luminance value of each pixel in the target area of the first image.

In this embodiment of this application, a predetermined target area of a pre-stored image photographed by the color camera at any photographing distance is a position area in which the target object is located in the image.

In this embodiment of this application, the brightness increasing module 1030 is configured to:

use each pixel in a target area of the target image as a first target pixel; and add, for each first target pixel, a luminance value of the first target pixel to a first luminance value to obtain a first target luminance value, and increase the luminance value of the first target pixel to the first target luminance value, where the first luminance value is a sum of luminance values of pixels corresponding to the first target pixel in a target area of each first image other than the target image.

In this embodiment of this application, the brightness increasing module 1030 is further configured to:

increase an obtained luminance value of each pixel in a non-target area of the target image by a preset multiple, where the preset multiple is N−1 times.

In this embodiment of this application, the luminance value obtaining module 1020 is configured to:

obtain, for each first image, luminance values of all pixels in the first image.

In this embodiment of this application, the brightness increasing module 1030 is further configured to:

use each pixel in the target image as a second target pixel; and add, for each second target pixel, a luminance value of the second target pixel to a second luminance value to obtain a second target luminance value, and increase the luminance value of the second target pixel to the second target luminance value, where the second luminance value is a sum of luminance values of pixels corresponding to the second target pixel in each first image other than the target image.

According to a third aspect, this application further provides an electronic device, including:

an under-screen camera assembly, including M color cameras; and an image processing apparatus, configured to obtain a first image photographed by each of N color cameras in the M color cameras; obtain, for each first image, luminance values of at least a part of pixels in the first image; and increase brightness of a target image by using the obtained luminance values, and use the target image with increased brightness as an image photographed by the under-screen camera assembly, the target image being the first image photographed by one of the N color cameras, where both M and N are integers greater than or equal to 2, and N is less than or equal to M.

The electronic device provided in this embodiment of this application may include the display panel 210 in FIG. 2. In the electronic device according to this embodiment, the under-screen camera assembly may be the under-screen camera assembly 220 described above with reference to FIG. 2 and any embodiment thereof. The image processing apparatus may be the image processing apparatus 1000 described with reference to FIG. 10 and any embodiment thereof.

According to a fourth aspect, this application further provides an electronic device, including:

a memory, configured to store a program; and a processor, configured to run a program stored in the memory to execute each step in the image processing method according to the embodiments of this application, where the method includes: obtaining a first image photographed by each of N color cameras in the M color cameras; obtaining, for each first image, luminance values of at least a part of pixels in the first image; and increasing brightness of a target image by using the obtained luminance values, and using the target image with increased brightness as an image photographed by the under-screen camera assembly 220, the target image being the first image photographed by one of the N color cameras.

The electronic device provided in this application can implement each process in any embodiment of the foregoing image processing method according to the first aspect of this application. To avoid repetition, details are not described herein again. In this embodiment of this application, the luminance values of the at least a part of pixels in the first image collected by each color camera that is disposed at a side of a second surface 210b of a display panel 210 and that is corresponding to a light-transmitting area 210c are used to increase the brightness of the target image, and the target image with increased brightness is used as an image photographed by the under-screen camera assembly 220, thereby increasing the brightness of the image photographed by the under-screen camera assembly 220 while realizing the full-screen display.

Figure 11:
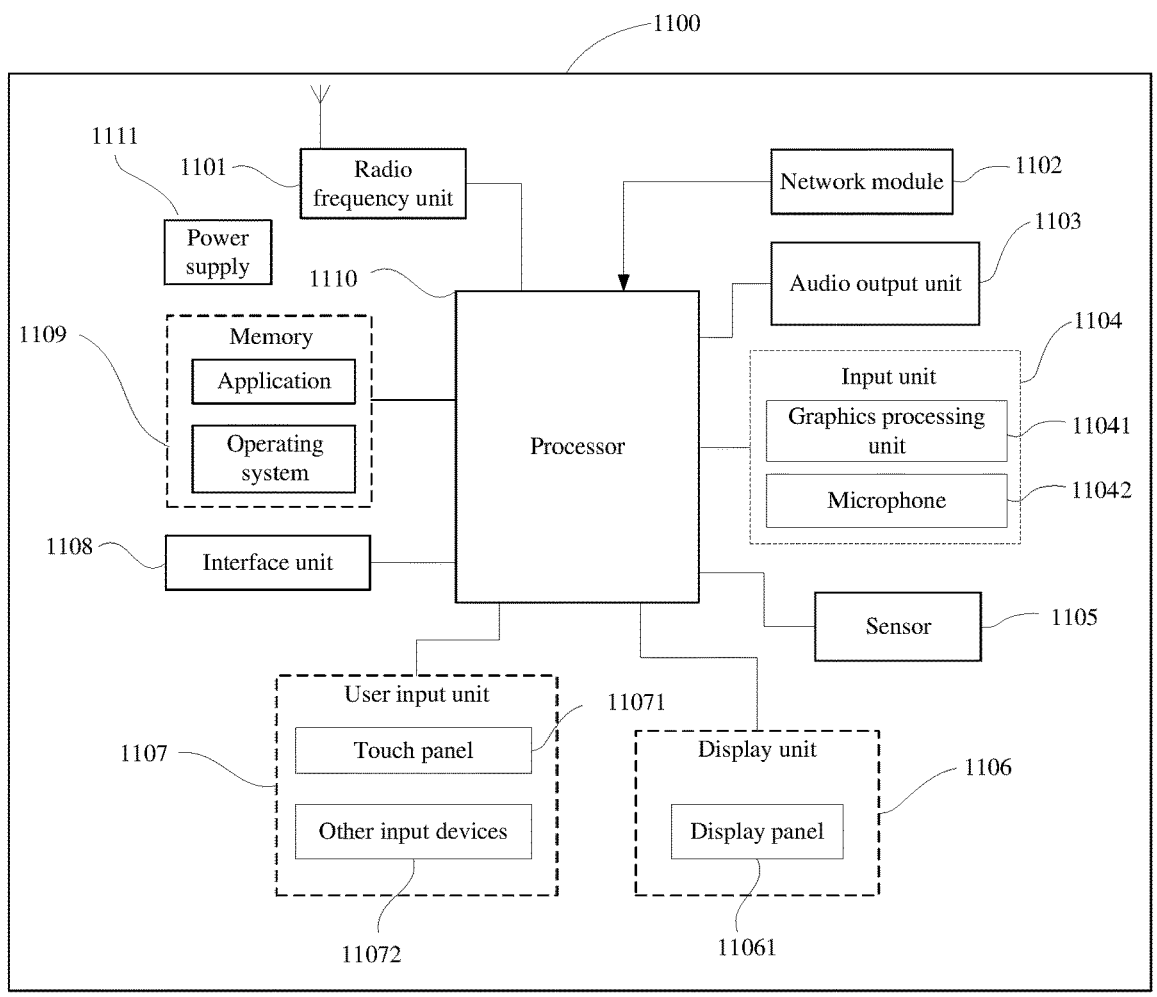
FIG. 11 is a schematic structural diagram of an embodiment of an electronic device according to this application.

FIG. 11 is a schematic structural diagram of an embodiment of an electronic device according to a fourth aspect of this application.

The electronic device 1100 includes but is not limited to components such as a radio frequency unit 1101, a network module 1102, an audio output unit 1103, an input unit 1104, a sensor 1105, a display unit 1106, a user input unit 1107, an interface unit 1108, a memory 1109, a processor 1110, and a power supply 1111. The electronic device 1100 further includes a first screen and a second screen. A person skilled in the art may understand that the structure of the electronic device shown in FIG. 11 constitutes no limitation on the electronic device. The electronic device may include more or fewer components than those shown in the figure, or a combination of some components, or an arrangement of different components. In this embodiment of this application, the electronic device includes but is not limited to a mobile phone, a tablet computer, a notebook computer, a palmtop computer, a vehicle-mounted terminal, a wearable device, a pedometer, or the like.

The processor 1110 is configured to obtain a first image photographed by each of N color cameras in the M color cameras; obtain, for each first image, luminance values of at least a part of pixels in the first image; and increase brightness of a target image by using the obtained luminance values, and use the target image with increased brightness as an image photographed by the under-screen camera assembly 220, the target image being the first image photographed by one of the N color cameras.

In this embodiment of this application, the luminance values of the at least a part of pixels in the first image collected by each color camera that is disposed at a side of a second surface 210b of a display panel 210 and that is corresponding to a light-transmitting area 210c are used to increase the brightness of the target image, and the target image with increased brightness is used as an image photographed by the under-screen camera assembly 220, thereby increasing the brightness of the image photographed by the under-screen camera assembly 220 while realizing the full-screen display.

It should be understood that, in this embodiment of this application, the radio frequency unit 1101 may be configured to receive and send information, or receive and send signals during a call. For example, the radio frequency unit receives downlink data from a base station, sends the downlink data to the processor 1110 for processing, and sends uplink data to the base station. Generally, the radio frequency unit 1101 includes but is not limited to: an antenna, at least one amplifier, a transceiver, a coupler, a low noise amplifier, a duplexer, and the like. In addition, the radio frequency unit 1101 may further communicate with another device by using a wireless communications system and network.

The electronic device provides users with wireless broadband Internet access through the network module 1102, for example, helps users receive and send e-mails, browse web pages, and access streaming media.

The audio output unit 1103 can convert audio data received by the radio frequency unit 1101 or the network module 1102 or stored in the memory 1109 into an audio signal, and output the audio signal into sound. Moreover, the audio output unit 1103 may further provide an audio output (for example, call signal receiving sound and message receiving sound) related to a specific function performed by the electronic device 1100. The audio output unit 1103 includes a speaker, a buzzer, a telephone receiver, and the like.

The input unit 1104 is used to receive audio or video signals. The input unit 1104 may include a graphics processing unit (GPU) 11041 and a microphone 11042. The graphics processing unit 11041 processes image data of a static picture or a video obtained by an image capture apparatus (for example, a camera) in a video capture mode or image capture mode. A processed image frame may be displayed on the display unit 1106. The image frame processed by the graphics processing unit 11041 may be stored in the memory 1109 (or other storage medium) or sent by using the radio frequency unit 1101 or the network module 1102. The microphone 11042 may receive a sound and can process the sound into audio data. The processed audio data may be converted, in a call mode, into a format that may be sent by the radio frequency unit 1101 to a mobile communication base station for output.

The electronic device 1100 further includes at least one sensor 1105, for example. a light sensor, a motor sensor, and another sensor. The light sensor includes an ambient light sensor and a proximity sensor. The ambient light sensor can adjust brightness of a display panel 11061 according to ambient light brightness. The proximity sensor can switch off the display panel 11061 and/or backlight when the electronic device 1100 moves close to an ear. As a type of the motion sensor, an accelerometer sensor may detect an acceleration value in each direction (generally, three axes), and detect a value and a direction of gravity when the accelerometer sensor is static, and may be configured to recognize a mobile terminal posture (such as screen switching between landscape and portrait modes, a related game, or magnetometer posture calibration), a function related to vibration recognition (such as a pedometer or a knock), and the like. The sensor 1105 may further include a fingerprint sensor, a pressure sensor, an iris sensor, a molecular sensor, a gyroscope, a barometer, a hygrometer, a thermometer, an infrared sensor, and the like. Details are not described herein again.

The display unit 1106 is configured to display information entered by a user or information provided for the user. The display unit 1106 may include a display panel 11061, and the display panel 11061 may be configured in a form of a liquid crystal display (LCD), an organic light-emitting diode (OLED), or the like.

The user input unit 1107 can be configured to receive entered number or character information, and generate key signal input related to user settings and function control of the electronic device. The user input unit 1107 includes a touch panel 11071 and other input devices 11072. The touch panel 11071 is also referred to as a touchscreen, and may collect a touch operation performed by a user on or near the touch panel (for example, an operation performed by the user on the touch panel 11071 or near the touch panel 11071 with any suitable object or accessory such as a finger or a stylus). The touch panel 11071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 1110, and receives and executes a command sent by the processor 1110. In addition, the touch panel 11071 may be implemented in a plurality of forms, such as a resistive type, a capacitive type, an infrared ray and a surface acoustic wave. In addition to the touch panel 11071, the user input unit 1107 may further include another input device 11072. The another input device 11072 may include, but is not limited to, a physical keyboard, a functional button (such as a volume control button or a power on/off button), a trackball, a mouse, and a joystick. Details are not described herein again.

Optionally, the touch panel 11071 may cover the display panel 11061. When detecting a touch operation on or near the touch panel 11071, the touch panel 11071 transmits the touch operation to the processor 1110 to determine a type of a touch event. Then the processor 1110 provides a corresponding visual output on the display panel 11061 based on the type of the touch event. Although in FIG. 11, the touch panel 11071 and the display panel 11061 are configured as two independent components to implement input and output functions of the electronic device, in some embodiments, the touch panel 11071 and the display panel 11061 can be integrated to implement the input and output functions of the electronic device. Details are not limited herein.

The interface unit 1108 is an interface for connecting an external apparatus and the electronic device 1100. For example, the external device may include a wired or wireless headphone port, an external power supply (or a battery charger) port, a wired or wireless data port, a storage card port, a port used to connect to a device having an identity module, an audio input/output (I/O) port, a video I/O port, a headset port, and the like. The interface unit 1108 can be configured to receive input from an external apparatus (for example, data information and power) and transmit the received input to one or more elements in the electronic device 1100, or can be configured to transmit data between the electronic device 1100 and the external apparatus.

The memory 1109 may be configured to store a software program and various data. The memory 1109 may mainly include a program storage area and a data storage area. The program storage area may store an operating system, an application for at least one function (for example, a sound play function or an image play function), and the like. The data storage area may store data created based on use of the mobile phone (for example, audio data or an address book), and the like. In addition, the memory 1109 may include a high-speed random access memory, or may include a non-volatile memory, for example, at least one disk storage device, a flash memory, or another volatile solid-state storage device.

The processor 1110 is a control center of the electronic device and connects all parts of the electronic device using various interfaces and circuits. By running or executing software programs and/or modules stored in the memory 1109 and by calling data stored in the memory 1109, the processor 1110 implements various functions of the electronic device and processes data, thus performing overall monitoring on the electronic device. The processor 1110 may include one or more processing units. The processor 1110 may be integrated with an application processor and a modem processor. The application processor mainly processes an operating system, a user interface, an application, and the like. The modem processor mainly processes wireless communication. It may be understood that alternatively, the foregoing modem processor may not be integrated into the processor 1110.

The electronic device 1100 may further include the power supply 1111 (for example, a battery) supplying power to various components. The power supply 1111 may be logically connected to the processor 1110 through a power management system, so as to implement functions such as managing charging, discharging, and power consumption through the power management system.

In addition, the electronic device 1100 includes some functional modules not shown. Details are not described herein.

According to a fifth aspect, this application further provides a non-transitory computer-readable storage medium. The non-transitory computer-readable storage medium stores a computer program. The computer program, when executed by a processor, implements the processes of any embodiment of the image processing method according to the first aspect of this application, and a same technical effect can be achieved. To avoid repetition, details are not described herein again. The non-transitory computer-readable storage medium may include a read-only memory (ROM), a random access memory (RAM), a magnetic disk, or an optical disc.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or further include elements inherent to this process, method, article, or apparatus. An element limited by "includes a . . ." does not, without more constraints, preclude the presence of additional identical elements in the process, method, article, or device that includes the element.

Various aspects of the present disclosure are described with reference to the flowcharts and/or block diagrams of the method, the apparatus (system) or the computer program product in the embodiments of the present disclosure. It should be understood that each block in the flowcharts and/or block diagrams and a combination of blocks in the flowcharts and/or block diagrams can be implemented by the computer program instructions. These computer program instructions may be provided to a processor of a general-purpose computer, a special-purpose computer, or other programmable data processing apparatus to produce a machine that enables these instructions, which are executed via the processor of a computer or other programmable data processing apparatus, to implement functions/actions specified in one or more blocks of the flowcharts and/or block diagrams. This processor may be, but is not limited to a general-purpose processor, a special-purpose processor, an application-specific processor, or a field programmable logic array. It should also be understood that each block in the block diagrams and/or flowcharts and combinations of the blocks in the block diagrams and/or flowcharts may also be implemented by a dedicated hardware-based system for executing specified functions or actions, or may be implemented by a combination of dedicated hardware and computer instructions.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims of this application and the protection scope of claims, all of which fall within the protection of this application.

What is claimed is:

1. An image processing method, performed by an electronic device, wherein the electronic device comprises an under-screen camera assembly, the under-screen camera assembly comprises M color cameras, and the method comprises:
   obtaining a first image photographed by each of N color cameras in the M color cameras;
   obtaining luminance values of at least a part of pixels in the first image for each first image; and
   increasing brightness of a target image by using obtained luminance values, and using the target image with increased brightness as an image photographed by the under-screen camera assembly, the target image being the first image photographed by one of the N color cameras, wherein
   both M and N are integers greater than or equal to 2, and N is less than or equal to M.

2. The method according to claim 1, wherein the obtaining luminance values of at least a part of pixels in the first image for each first image comprises:
   obtaining a target photographing distance between the under-screen camera assembly and a target object of the under-screen camera assembly;
   obtaining a target area of each first image at the target photographing distance based on a predetermined target area in an image photographed by each color camera at pre-stored different photographing distances; and
   obtaining, for each first image, a luminance value of each pixel in the target area of the first image.

3. The method according to claim 2, wherein a predetermined target area of a pre-stored image photographed by the color camera at any photographing distance is a position area in which the target object is located in the image.

4. The method according to claim 2, wherein the increasing brightness of a target image by using obtained luminance values comprises:
   using each pixel in a target area of the target image as a first target pixel; and
   for each first target pixel, adding a luminance value of the first target pixel to a first luminance value to obtain a first target luminance value, and increasing the luminance value of the first target pixel to the first target luminance value, wherein
   the first luminance value is a sum of luminance values of pixels corresponding to the first target pixel in a target area of each first image other than the target image.

5. The method according to claim 4, wherein the increasing brightness of a target image by using obtained luminance values further comprises:
   increasing an obtained luminance value of each pixel in a non-target area of the target image by a preset multiple, wherein the preset multiple is N−1 times.

6. The method according to claim 1, wherein the obtaining luminance values of at least a part of pixels in the first image for each first image comprises:
   obtaining luminance values of all pixels in the first image for each first image.

7. The method according to claim 6, wherein the increasing brightness of a target image by using obtained luminance values comprises:

using each pixel in the target image as a second target pixel; and for each second target pixel, adding a luminance value of the second target pixel to a second luminance value to obtain a second target luminance value, and increasing the luminance value of the second target pixel to the second target luminance value, wherein the second luminance value is a sum of luminance values of pixels corresponding to the second target pixel in each first image other than the target image.

8. An electronic device, comprising:

an under-screen camera assembly, comprising M color cameras; and an image processing apparatus, configured to obtain a first image photographed by each of N color cameras in the M color cameras; obtain, for each first image, luminance values of at least a part of pixels in the first image; and increase brightness of a target image by using the obtained luminance values, and use the target image with increased brightness as an image photographed by the under-screen camera assembly, the target image being the first image photographed by one of the N color cameras, wherein both M and N are integers greater than or equal to 2, and N is less than or equal to M.

9. The electronic device according to claim 8, wherein the M color cameras are arranged in an array.

10. The electronic device according to claim 8, wherein fields of view of all cameras in the under-screen camera assembly have a same overlapping area.

11. The electronic device according to claim 8, wherein the color camera comprises:

a lens, a lens holder, a filter component, a photosensitive chip, and a circuit board connected to the photosensitive chip, wherein the lens holder is disposed on the circuit board, the lens and the filter component are disposed on the lens holder, and the filter component is located between the lens and the photosensitive chip.

12. An electronic device, comprising: a processor and a memory storing computer program instructions, wherein the electronic device further comprises an under-screen camera assembly, the under-screen camera assembly comprises M color cameras, and the computer program instructions, when executed by the processor, causes the electronic device to perform:

obtaining a first image photographed by each of N color cameras in the M color cameras;

obtaining luminance values of at least a part of pixels in the first image for each first image; and increasing brightness of a target image by using obtained luminance values, and using the target image with increased brightness as an image photographed by the under-screen camera assembly, the target image being the first image photographed by one of the N color cameras, wherein both M and N are integers greater than or equal to 2, and N is less than or equal to M.

13. The electronic device according to claim 12, wherein the computer program instructions, when executed by the processor, causes the electronic device to perform:

obtaining a target photographing distance between the under-screen camera assembly and a target object of the under-screen camera assembly;

obtaining a target area of each first image at the target photographing distance based on a predetermined target area in an image photographed by each color camera at pre-stored different photographing distances; and obtaining, for each first image, a luminance value of each pixel in the target area of the first image.

14. The electronic device according to claim 13, wherein a predetermined target area of a pre-stored image photographed by the color camera at any photographing distance is a position area in which the target object is located in the image.

15. The electronic device according to claim 13, wherein the computer program instructions, when executed by the processor, causes the electronic device to perform:

using each pixel in a target area of the target image as a first target pixel; and for each first target pixel, adding a luminance value of the first target pixel to a first luminance value to obtain a first target luminance value, and increasing the luminance value of the first target pixel to the first target luminance value, wherein the first luminance value is a sum of luminance values of pixels corresponding to the first target pixel in a target area of each first image other than the target image.

16. The electronic device according to claim 15, wherein the computer program instructions, when executed by the processor, causes the electronic device to further perform:

increasing an obtained luminance value of each pixel in a non-target area of the target image by a preset multiple, wherein the preset multiple is N−1 times.

17. The electronic device according to claim 12, wherein the computer program instructions, when executed by the processor, causes the electronic device to perform:

obtaining luminance values of all pixels in the first image for each first image.

18. The electronic device according to claim 17, wherein the computer program instructions, when executed by the processor, causes the electronic device to perform:

using each pixel in the target image as a second target pixel; and for each second target pixel, adding a luminance value of the second target pixel to a second luminance value to obtain a second target luminance value, and increasing the luminance value of the second target pixel to the second target luminance value, wherein the second luminance value is a sum of luminance values of pixels corresponding to the second target pixel in each first image other than the target image.

19. A non-transitory computer-readable storage medium, wherein the non-transitory computer-readable storage medium stores computer program instructions, and when the computer program instructions are executed by a processor, the method according to claim 1 is implemented.

* * * * *